(12) United States Patent
Du

(10) Patent No.: US 12,725,445 B2
(45) Date of Patent: Sep. 1, 2026

(54) ULTRASONIC FINGERPRINT APPARATUS AND ELECTRONIC DEVICE

(71) Applicant: HUIKE (SINGAPORE) HOLDING PTE.LTD., Singapore (SG)

(72) Inventor: Canhong Du, Guangdong (CN)

(73) Assignee: HUIKE (SINGAPORE) HOLDING PTE.LTD., Singapore (SG)

( * ) Notice: Subject to any disclaimer, the term of this patent is extended or adjusted under 35 U.S.C. 154(b) by 250 days.

(21) Appl. No.: 18/455,509

(22) Filed: Aug. 24, 2023

(65) Prior Publication Data

US 2024/0087355 A1 Mar. 14, 2024

Related U.S. Application Data

(63) Continuation of application No. PCT/CN2022/118481, filed on Sep. 13, 2022.

(51) Int. Cl.
*G06V 40/13* (2022.01)
*G06V 40/12* (2022.01)

(52) U.S. Cl.
CPC ...... *G06V 40/1306* (2022.01); *G06V 40/1365* (2022.01)

(58) Field of Classification Search
CPC ...................... G06V 40/1306; G06V 40/1365
See application file for complete search history.

(56) References Cited

U.S. PATENT DOCUMENTS 11,263,422 B2 3/2022 He et al.
11,386,690 B2 7/2022 Li et al.
(Continued)

FOREIGN PATENT DOCUMENTS

CN 101118595 A 2/2008
CN 106356342 A 1/2017
(Continued)

OTHER PUBLICATIONS

Lu, Y., "Piezoelectric Micromachined Ultrasonic Transducers for Fingerprint Sensing", PhD Thesis, Retrieved from the Internet:URL:http://media.proquest.com/media/pq/classic/doc/3854239151/fmt/ai/rep/NPDF?hl=&cit:auth=Lu,Yipeng&cit:title=Piezoelectric micromachined ultrasonic transducers forfingerprint sensing&cit:pub=ProQuest Dissertations and Theses&cit:vol=&cit:iss=&cit:pg=n/a&cit:date=2015&ic=true&cit:prod=ProQuest Disser [retrieved on Jan. 15, 2016] , pp. 1-145.
(Continued)

*Primary Examiner* — Wassim Mahrouka
(74) *Attorney, Agent, or Firm* — Scully, Scott, Murphy & Presser, P.C.

(57) ABSTRACT

An ultrasonic fingerprint apparatus and an electronic device are provided. The ultrasonic fingerprint apparatus is disposed under a display of an electronic device to implement under-display ultrasonic fingerprint recognition. The ultrasonic fingerprint apparatus includes an ultrasonic fingerprint chip and a piezoelectric transducer disposed on the ultrasonic fingerprint chip. The piezoelectric transducer includes a piezoelectric layer, an upper electrode on the piezoelectric layer, and a lower electrode under the piezoelectric layer. The ultrasonic fingerprint chip is a CMOS chip. The upper electrode is led out to a surface of the CMOS chip, and is connected to one end of a lead via a pad on the surface of the CMOS chip, and the other end of the lead is connected to a circuit board under the ultrasonic fingerprint chip, to implement an electrical connection between the piezoelectric transducer and the circuit board.

19 Claims, 10 Drawing Sheets

(56) References Cited

U.S. PATENT DOCUMENTS

| | | | |
|---|---|---|---|
| 11,423,686 B2 | 8/2022 | Tsai et al. | |
| 2014/0352440 A1* | 12/2014 | Fennell | H10N 30/03<br>29/25.35 |
| 2017/0364726 A1* | 12/2017 | Buchan | G01N 29/2437 |
| 2018/0068148 A1 | 3/2018 | Sun et al. | |
| 2018/0314871 A1 | 11/2018 | He et al. | |
| 2020/0234023 A1 | 7/2020 | Tsai et al. | |
| 2022/0036027 A1 | 2/2022 | Li et al. | |

FOREIGN PATENT DOCUMENTS

| | | |
|---|---|---|
| CN | 107977602 A | 5/2018 |
| CN | 207718390 U | 8/2018 |
| CN | 108764087 A | 11/2018 |
| CN | 109154986 A | 1/2019 |
| CN | 109313702 A | 2/2019 |
| CN | 110298288 A | 10/2019 |
| CN | 111428702 A | 7/2020 |
| CN | 111523436 A | 8/2020 |
| CN | 112257602 A | 1/2021 |
| CN | 215679319 U | 1/2022 |
| CN | 109313702 B | 7/2022 |
| CN | 114758367 A | 7/2022 |
| CN | 218004133 U | 12/2022 |
| CN | 218181551 U | 12/2022 |

OTHER PUBLICATIONS

Jiang, X. et al., “Monolithic ultrasound fingerprint sensor”, Microsystems & Nanoengineering, vol. 3, No. 1, ISSN: 2055-7434, DOI: 10.1038/micronano.2017.59Retrieved from the Internet: URL:https://www.nature.com/articles/micronano201759>, pp. 1-8.

* cited by examiner

ULTRASONIC FINGERPRINT APPARATUS AND ELECTRONIC DEVICE

CROSS-REFERENCE TO RELATED APPLICATION

This application is a continuation of International Application No. PCT/CN2022/118481, filed on Sep. 13, 2022, the disclosure of which is hereby incorporated by reference in its entirety.

TECHNICAL FIELD

Embodiments of the present application relate to the fingerprint recognition field, and more specifically, to an ultrasonic fingerprint apparatus and an electronic device.

BACKGROUND

With the progress of society, mobile phones have become one of the indispensable electronic devices in modern life. Currently, a mobile phone on the market has one or more identity authentication methods, including a digital password, a gesture-based pattern, facial recognition, fingerprint recognition, and the like. Among them, fingerprint recognition has become a standard configuration of most mobile phones because of its features such as convenient application, fast recognition, stability, and reliability. There are also different types of fingerprint recognition technologies, including capacitive fingerprint recognition, optical fingerprint recognition, ultrasonic fingerprint recognition, and the like.

The ultrasonic fingerprint recognition can not only recognize a surface appearance of fingerprints, but also recognize a signal from the dermis layer of a finger, to achieve natural 3D anti-counterfeiting. In addition, compared with the optical fingerprint recognition, the ultrasonic fingerprint recognition is more tolerant of the cleanliness of a finger surface. Therefore, the ultrasonic fingerprint recognition has gradually become a new-generation fingerprint recognition method. An ultrasonic fingerprint apparatus usually includes a piezoelectric transducer and an ultrasonic fingerprint chip. How to integrate the piezoelectric transducer and the ultrasonic fingerprint chip has become a problem that needs to be solved.

SUMMARY

Embodiments of the present application provide an ultrasonic fingerprint apparatus and an electronic device, to integrate a piezoelectric transducer and an ultrasonic fingerprint chip.

According to a first aspect, an ultrasonic fingerprint apparatus is provided, and is disposed under a display of an electronic device to implement under-display ultrasonic fingerprint recognition. The ultrasonic fingerprint apparatus includes an ultrasonic fingerprint chip and a piezoelectric transducer disposed on the ultrasonic fingerprint chip.

The piezoelectric transducer includes a piezoelectric layer, an upper electrode on the piezoelectric layer, and a lower electrode under the piezoelectric layer.

The ultrasonic fingerprint chip is a CMOS chip. The upper electrode is led out from an upper surface of the piezoelectric layer to a surface of the CMOS chip, and is connected to one end of a lead via a pad on the surface of the CMOS chip, and the other end of the lead is connected to a circuit board under the ultrasonic fingerprint chip, to implement an electrical connection between the piezoelectric transducer and the circuit board.

In this embodiment of the present application, the ultrasonic fingerprint apparatus includes the CMOS chip and the ultrasonic transducer, and a substrate of the CMOS chip is a silicon substrate, so that wire bonding can be implemented. After the upper electrode is led out to the surface of the ultrasonic fingerprint chip, interconnection between the upper electrode and the lead can be implemented on the ultrasonic fingerprint chip through a bonding process. To be specific, the upper electrode is secured and connected to one end of the lead via the pad on the surface of the ultrasonic fingerprint chip, and the other end of the lead is connected to the circuit board under the ultrasonic fingerprint chip, to implement interconnection between the upper electrode and the circuit board. The process is easy to implement, and has a high reliability.

In an implementation, the ultrasonic fingerprint chip includes a substrate and a plurality of metal layers provided in a first region of the substrate. The substrate is a silicon substrate. The lower electrode is located on a second region of the substrate. A top metal layer of the plurality of metal layers includes N drive traces, where N is 1 or a positive integer greater than 1. The upper electrode is connected to N pads via the N drive traces respectively. The N pads connect the N drive traces to respective leads.

On the one hand, a silver paste material of the upper electrode has a very low packing density, and cannot support the bonding process. However, in this embodiment, the drive trace is provided on the ultrasonic fingerprint chip, so that the upper electrode can be led out to the surface of the ultrasonic fingerprint chip via the drive trace. On the other hand, because the CMOS chip is used, the bonding process can be implemented on the chip surface to connect the drive trace to the circuit board via the lead. In this way, interconnection between the upper electrode and the circuit board is implemented.

In an implementation, a passivation layer is provided on the top metal layer, the passivation layer is provided with a first window corresponding to the N drive traces, and the upper electrode extends from the upper surface of the piezoelectric layer into the first window, to connect to respective first connection regions of the N drive traces in the first window. In this way, an electrical connection between the upper electrode and the N drive traces is implemented.

In an implementation, the first window includes N sub windows corresponding to the N drive traces, and the first connection region of each drive trace is located in a sub window corresponding to the drive trace.

In an implementation, the passivation layer is further provided with N second windows corresponding to the N drive traces, and each drive trace is located in a second connection region in the second window corresponding to the drive trace, and is connected, via a pad corresponding to the drive trace, to a lead corresponding to the drive trace.

In this embodiment, the substrate of the CMOS chip is a silicon substrate, and the bonding process can be implemented on the substrate. Therefore, with the second window provided, the drive trace can be connected to the lead through the bonding process, to connect the drive trace to the circuit board via the lead.

In an implementation, the piezoelectric layer extends onto the plurality of metal layers, the N drive traces extend into the piezoelectric layer, and the first connection regions of the N drive traces are adjacent to the piezoelectric layer.

When the piezoelectric layer extends onto the plurality of metal layers and the drive trace extends into the piezoelectric layer, the first connection region of the drive trace can be close to an edge of the piezoelectric layer, that is, a distance between the piezoelectric layer and the first connection region is minimized, so that a structure of the ultrasonic fingerprint apparatus is more compact.

In an implementation, a size of the first window is greater than that of the first connection regions of the N drive traces, the upper electrode extends from the upper surface of the piezoelectric layer to a first part of the first window to cover the first connection regions of the N drive traces, and a second part of the first window is located under the piezoelectric layer.

When the size of the first window is greater than that of the first connection regions of the N drive traces, the upper electrode extends to the first part of the first window to cover a first connection region of the drive trace in the first part, and the second part of the first window extends into the piezoelectric layer and is located under the piezoelectric layer, to improve reliability of a connection between the upper electrode and the drive trace.

In an implementation, a size of the first part in a direction of the N drive traces is greater than or equal to 150 μm; and/or a size of the second part in the direction of the N drive traces is greater than or equal to 20 μm.

In an implementation, a distance between the N drive traces and other traces adjacent to the N drive traces at the top metal layer is greater than or equal to 10 μm.

Because a voltage of a drive signal of the upper electrode is usually high and is significantly higher than an operating voltage of a line in the ultrasonic fingerprint chip, the drive signal of the upper electrode is likely to interfere with the line in the ultrasonic fingerprint chip, and is also likely to cause electrical breakdown to damage the ultrasonic fingerprint chip. Therefore, a specific distance should be kept between the drive trace and another trace adjacent to the drive trace at the top metal layer, to avoid breakdown at a same layer, ensure safety of the ultrasonic fingerprint apparatus, and also prevent the drive trace from interfering with another trace at the top metal layer.

In an implementation, other traces adjacent to the N drive traces at the top metal layer are grounded. In this way, the top metal layer performs a function of shielding the N drive traces, to prevent the N drive traces from interfering with other traces at the top metal layer.

In an implementation, a region, at a first metal layer of the plurality of metal layers, that corresponds to the N drive traces is punched, and the first metal layer is an adjacent metal layer under the top metal layer.

The first metal layer is an adjacent metal layer under the top metal layer. A corresponding region under the N drive traces at the first metal layer is punched, so that an electrical clearance between the N drive traces and other traces at the first metal layer is increased. In this way, a voltage withstand strength of the first metal layer is improved, to avoid inter-layer breakdown between the top metal layer and the first metal layer.

In an implementation, the region, at the first metal layer, that corresponds to the N drive traces, and a region extending 12 μm or more around from the region are punched.

A punched region is extended around from the region corresponding to the N drive traces by a specific distance, so that the electrical clearance between the drive trace and another trace at the first metal layer is further increased, to avoid inter-layer breakdown between the top metal layer and the first metal layer to a maximum extent.

In an implementation, a region, at a second metal layer of the plurality of metal layers, that corresponds to the N drive traces is grounded, and the second metal layer is an adjacent metal layer under the first metal layer.

The second metal layer is an adjacent metal layer under the first metal layer. A corresponding region under the drive trace at the second metal layer is grounded, so that the second metal layer performs a function of shielding the N drive traces, to prevent another trace at the second metal layer from interfering with a trace at a third metal layer under the another trace.

In an implementation, the region, at the second metal layer, that corresponds to the N drive traces, and a region extending 12 μm or more around from the region are grounded.

A grounded region at the second metal layer is extended around from the region corresponding to the N drive traces by a specific distance, so that the function of shielding the drive trace by the second metal layer is further enhanced, to minimize interference caused by another trace at the second metal layer to a trace at the third metal layer under the another trace.

In an implementation, the top metal layer is provided with a pad for grounding, and the pad is provided on a side of the second connection regions of the N drive traces.

To prevent a high voltage of the drive trace from causing electrical breakdown or interference to the metal layer in the ultrasonic fingerprint chip, a grounded pad is provided on a side of a second connection region of the drive trace, and there is a specific distance between the pad and the second connection region, to prevent a drive signal from interfering with other surrounding signals.

In an implementation, a distance between the lower electrode and a passivation layer around the lower electrode is greater than or equal to 100 μm; and/or other traces adjacent to the lower electrode at the top metal layer are grounded.

There is a specific distance between the lower electrode and the passivation layer around the lower electrode, and/or other traces adjacent to the lower electrode at the top metal layer are grounded. This can perform a shielding function to prevent external interference from affecting pixels close to an edge of an array of the lower electrode, alleviate edge effect of edge pixels, and improve uniformity between the edge pixels and center pixels.

In an implementation, a distance between an edge of the upper electrode and an edge of the piezoelectric layer is greater than or equal to 50 μm. This prevents the upper electrode from overflowing to the surface of the ultrasonic fingerprint chip, and avoids a breakdown risk.

In an implementation, N=1, and an area of a part of the first window that is close to the piezoelectric layer is greater than that of a part of the first window that is away from the piezoelectric layer. In this way, reliability of a connection between the upper electrode and the drive trace is improved.

In an implementation, a shape of the first window is a trapezoid, and a lower base of the trapezoid is closer to the piezoelectric layer than an upper base of the trapezoid.

In an implementation, a shape of the first window is an L shape, and the L shape includes a first part parallel to the direction of the drive trace, and a second part perpendicular to the direction of the drive trace, and the second part is closer to the piezoelectric layer than the first part.

According to a second aspect, an electronic device is provided, and includes: a display; and an ultrasonic fingerprint apparatus according to any one of the first aspect or the implementations of the first aspect, where the ultrasonic fingerprint apparatus is disposed under the display to implement under-display ultrasonic fingerprint recognition.

DESCRIPTION OF EMBODIMENTS

The technical solutions in the present application will be described below with reference to the accompanying drawings.

Figure 1:
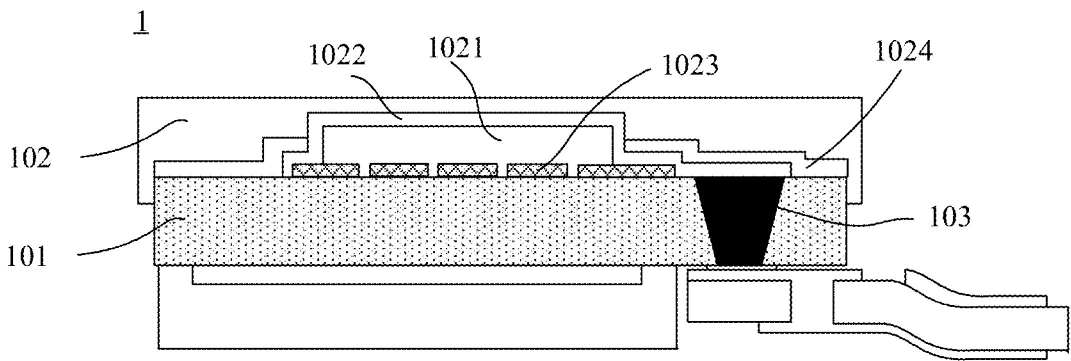
FIG. 1 shows a manner of integration between a piezoelectric transducer and an ultrasonic fingerprint chip in an ultrasonic fingerprint apparatus.

FIG. 1 shows a conventional ultrasonic fingerprint apparatus 1. The ultrasonic fingerprint apparatus 1 includes an ultrasonic fingerprint chip 101 and a piezoelectric transducer 102. The piezoelectric transducer 102 includes a piezoelectric layer 1021, an upper electrode 1022 on the piezoelectric layer 1021, and a lower electrode 1023 under the piezoelectric layer 1021. The piezoelectric layer 1021 is made of a piezoelectric material such as PVDF or PVDF-TrFE. The piezoelectric transducer 102, also referred to as an ultrasonic transducer, is disposed on the ultrasonic fingerprint chip 101. A passivation layer 1024 provides protection. The ultrasonic fingerprint chip 101 is a thin film transistor (TFT).

The upper electrode 1022 is usually made of a metal or metal paste material, such as silver paste (Ag). The silver paste has a very low packing density and does not support a bonding process (or referred to as a wire bonding process), and needs to be led out through a lead and connected to a circuit board (not shown in FIG. 1) under the ultrasonic fingerprint chip 101, to implement interconnection between the upper electrode 1022 and the circuit board. In this way, a drive signal output by the circuit board can be transmitted to the piezoelectric transducer 102 through the lead, to stimulate the piezoelectric transducer 102 to generate an ultrasonic signal for fingerprint recognition. In addition, a signal of the upper electrode 1022 may be further led out to the circuit board through the lead.

The ultrasonic fingerprint chip 101 shown in FIG. 1 is a TFT. A trace on a surface of the TFT has a low packing density that is determined by its process characteristics, and cannot meet requirements of the bonding process. Therefore, the upper electrode 1022 cannot be connected to the circuit board on the surface of ultrasonic fingerprint chip 101 by a lead, and the upper electrode 1022 can be led out only through another process. For example, as shown in FIG. 1, a TVS through hole 103 is provided in the ultrasonic fingerprint chip 101, and the TVS through hole 103 is filled with a conductive material. In this way, the upper electrode 1022 can be led out to the circuit board through the TVS through hole 103. Alternatively, the upper electrode 1022 may be led out to the circuit board by means of press-fitting or the like.

If the bonding process is to be performed on the surface of the TFT to connect the upper electrode 1022 and the lead using a bonding pad on the surface of the TFT, some special processing needs to be performed on the TFT, for example, gold plating is performed on the surface of the TFT. Otherwise, problems such as poor reliability occur, easily causing phenomena such as aging and falling apart. However, methods such as gold plating increase process complexity and costs of the ultrasonic fingerprint apparatus 1.

In view of this, an embodiment of the present application provides an ultrasonic fingerprint apparatus, to lead out an upper electrode on a surface of an ultrasonic fingerprint chip through a bonding process, so that a connection between the upper electrode and a circuit board under the ultrasonic fingerprint chip has a high reliability.

Figure 2:
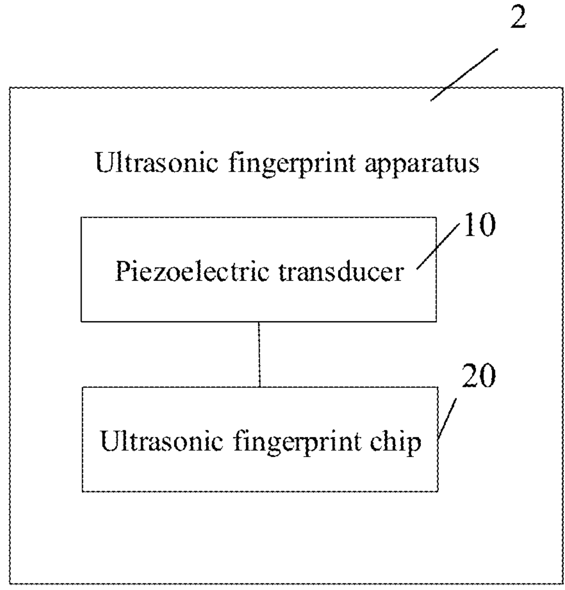
FIG. 2 is a schematic block diagram of an ultrasonic fingerprint apparatus according to embodiment of the present application.

FIG. 2 is a schematic diagram of a structure of an ultrasonic fingerprint apparatus according to embodiment of the present application. As shown in FIG. 2, the ultrasonic fingerprint apparatus 2 includes a piezoelectric transducer 10 and an ultrasonic fingerprint chip 20.

Figure 3:
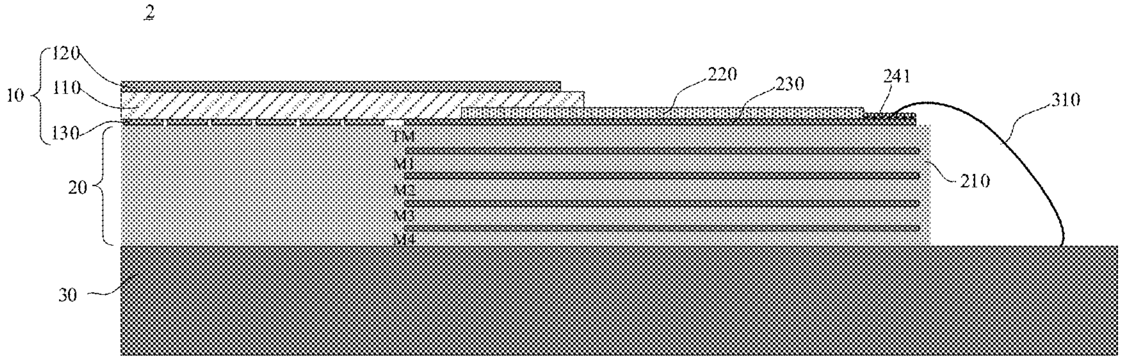
FIG. 3 is a schematic diagram of a possible structure of the ultrasonic fingerprint apparatus shown in FIG. 2.

FIG. 3 is a schematic diagram of a possible structure of the ultrasonic fingerprint apparatus 2 shown in FIG. 2. As shown in FIG. 3, the piezoelectric transducer 10 is disposed on the ultrasonic fingerprint chip 20, and the piezoelectric transducer 10 includes a piezoelectric layer 110, an upper electrode 120 on the piezoelectric layer 110, and a lower electrode 130 under the piezoelectric layer 110.

For example, the ultrasonic fingerprint chip 20 may be a complementary metal-oxide-semiconductor transistor (CMOS) chip. The upper electrode 120 is led out from an upper surface of the piezoelectric layer 110 to a surface of the CMOS chip 20, and is connected to one end of a lead 310 via a pad 241 on the surface of CMOS chip 20, and the other end of the lead 310 is connected to a circuit board 30 under the ultrasonic fingerprint chip, to implement an electrical connection between the piezoelectric transducer 10 and the circuit board 30.

The ultrasonic fingerprint chip 20 is an application specific integrated circuit (ASIC) for ultrasonic fingerprint recognition. The CMOS chip is used in this embodiment of the present application. The ultrasonic fingerprint chip 20 may output a drive signal, which is loaded to the upper electrode 120 and the lower electrode 130 of the piezoelectric layer 110. Under the action of the drive signal, the piezoelectric layer 110 vibrates based on the piezoelectric effect, to transmit an ultrasonic signal to a finger on a display. The ultrasonic signal is transmitted to a surface of the finger, and is reflected or scattered at a fingerprint valley and a fingerprint ridge to return an ultrasonic detection signal. The ultrasonic detection signal is transmitted to the piezoelectric layer 110, and a potential difference occurs between the electrodes on two sides of the piezoelectric layer 110 based on the inverse piezoelectric effect, to obtain a corresponding electrical signal. Fingerprint information of the finger may be obtained through subsequent processing on the electrical signal.

For example, the piezoelectric layer 110 may be made of a piezoelectric material such as PVDF or PVDF-TrFE. The CMOS chip 20 is used in the ultrasonic fingerprint apparatus 2 in this embodiment of the present application. A substrate 210 of the CMOS chip 20 is a silicon substrate, and wire bonding can be implemented on the silicon substrate. After the upper electrode 120 is led out to the substrate 210, interconnection between the upper electrode 120 and the lead 310 can be implemented on the substrate 210 through a bonding process. That is, the upper electrode 120 is secured and connected to one end of the lead 310 via the pad 241 on the surface of the ultrasonic fingerprint chip 20, and the other end of the lead 310 is connected to the circuit board 30 under the ultrasonic fingerprint chip 20, to implement interconnection between the upper electrode 120 and the circuit board 30. The process is easy to implement, and has a high reliability.

However, the ultrasonic fingerprint apparatus 2 shown in FIG. 3 has the following problems: First, the upper electrode 120 needs a lead, that is, an electrical connection between the upper electrode 120 and the circuit board 30 under the ultrasonic fingerprint chip 20 needs to be implemented, to apply a drive signal to the ultrasonic transducer 10. Second, the drive signal of the upper electrode 120 usually requires a high voltage of tens of volts. If the drive signal of the upper electrode 120 is led out to the surface of the ultrasonic fingerprint chip 20, because a drive voltage of the upper electrode 120 is significantly higher than an operating voltage of a line in the ultrasonic fingerprint chip 20, the drive signal of the upper electrode 120 is likely to interfere with the line in the ultrasonic fingerprint chip 20, and is also likely to cause electrical breakdown to damage the ultrasonic fingerprint chip 20.

In view of this, in an implementation, a drive trace 230 may be provided on the ultrasonic fingerprint chip 20, and the upper electrode 120 is connected to the pad 241 via the drive trace 230. The pad 241 is also referred to as a bonding pad 241 below. For example, referring also to FIG. 4 to FIG. 6, the ultrasonic fingerprint chip 20 includes the substrate 210 and a plurality of metal layers provided in a first region 201 of the substrate 210. The substrate 210 is a silicon substrate. The lower electrode 130 is located on a second region 202 of the substrate 210. A top metal layer TM of the plurality of metal layers includes N drive traces, where N is 1 or a positive integer greater than 1. The upper electrode 120 is connected to N pads 241 via the N drive traces 230 respectively. The N pads 241 connect the N drive traces 230 to respective leads 310.

On the one hand, a silver paste material of the upper electrode 120 has a very low packing density, and cannot support the bonding process. However, in this embodiment, the drive trace 230 is provided on the ultrasonic fingerprint chip, so that the upper electrode 120 can be led out to the surface of the ultrasonic fingerprint chip 20 via the drive trace 230. On the other hand, because the CMOS chip is used, the bonding process can be implemented on the chip surface to connect the drive trace 230 to the circuit board 30 via the lead 310. In this way, interconnection between the upper electrode 120 and the circuit board 30 is implemented.

Figure 4:
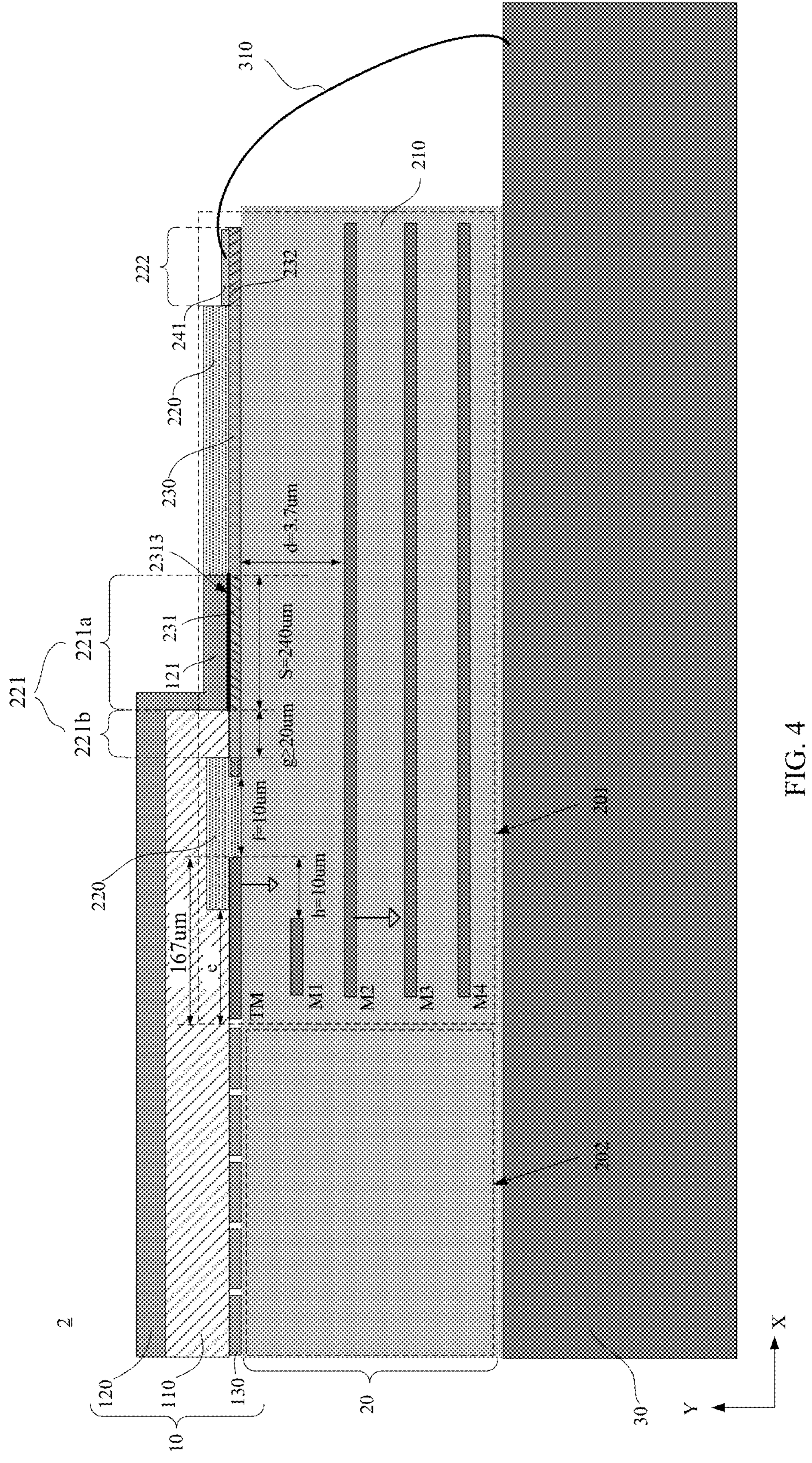
FIG. 4 is a schematic diagram of another possible structure of the ultrasonic fingerprint apparatus shown in FIG. 2.
Figure 5:
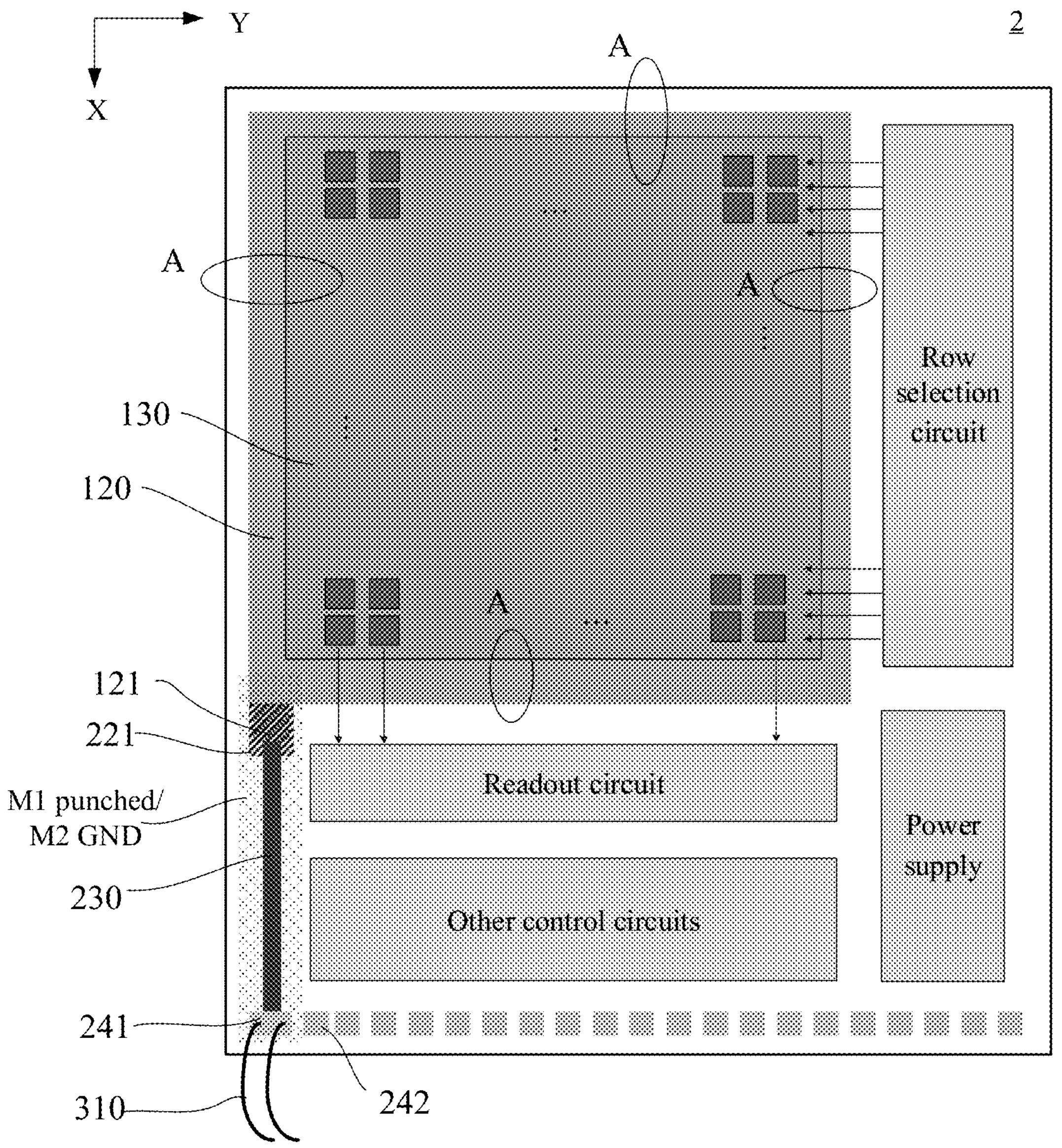
FIG. 5 is schematic top view of a possible structure of the ultrasonic fingerprint apparatus shown in FIG. 4.
Figure 6:
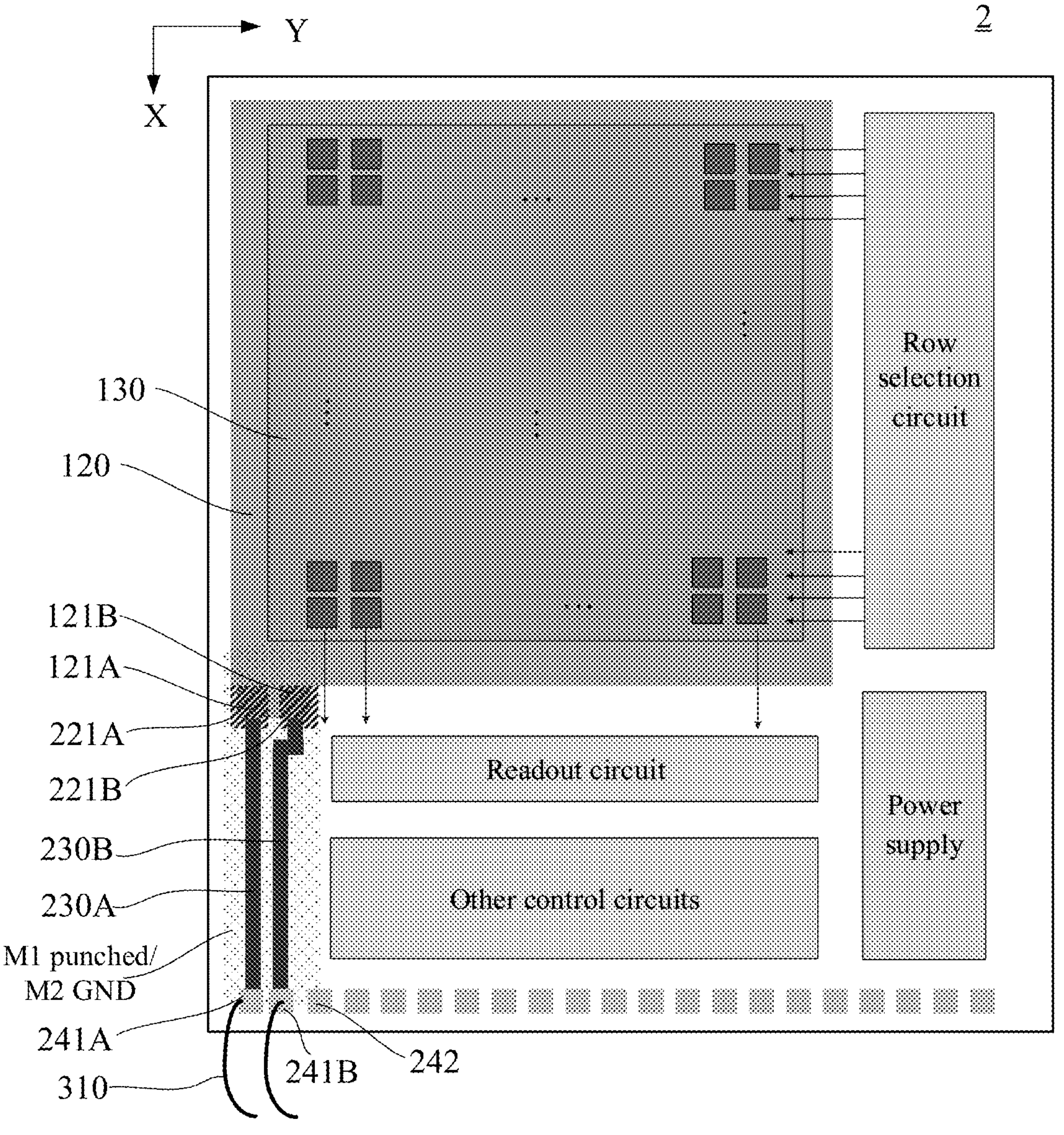
FIG. 6 is a schematic top view of another possible structure of the ultrasonic fingerprint apparatus shown in FIG. 4.

In an implementation, as shown in FIG. 4 to FIG. 6, a passivation layer 220 is provided on the top metal layer TM, and the passivation layer 220 provides protection. The passivation layer 220 is provided with a first window 221 corresponding to the N drive traces 230. Apart of each drive trace 230 in the first window 221 is a first connection region 231 of the drive trace 230. The upper electrode 120 extends from the upper surface of the piezoelectric layer 110 into the first window 221, to connect to respective first connection regions 231 of the N drive traces 230 in the first window 221.

In this embodiment, the top metal layer TM of the ultrasonic fingerprint chip 20 includes the N drive traces 230 for connecting to the upper electrode 120, the passivation layer 220 on the top metal layer TM is provided with the first window 221, and the upper electrode 120 extends from the upper surface and an edge of the piezoelectric layer 110 into the first window 221, and covers the respective first connection regions 231 of the N drive traces 230 in the first window 221, to implement an electrical connection between the upper electrode 120 and the N drive traces 230.

As an example, the ultrasonic fingerprint apparatus 2 in the embodiments of the present application is described in detail below with reference to FIG. 4 to FIG. 13. The ultrasonic fingerprint apparatus 2 in the embodiments of the present application may be disposed under a display of an electronic device to implement under-display ultrasonic fingerprint recognition.

As shown in FIG. 4, the ultrasonic fingerprint apparatus 2 includes a piezoelectric transducer 10 and an ultrasonic fingerprint chip 20, the piezoelectric transducer 10 is disposed on the ultrasonic fingerprint chip 20, and the piezoelectric transducer 10 includes a piezoelectric layer 110, an upper electrode 120 on the piezoelectric layer 110, and a lower electrode 130 under the piezoelectric layer 110. The ultrasonic fingerprint chip 20 includes a substrate 210 and a plurality of metal layers provided in a first region 201 of the substrate 210. In FIG. 4, for example, the plurality of metal layers include a first metal layer M1, a second metal layer M2, a third metal layer M3, a fourth metal layer M4, and a top metal layer TM. The ultrasonic fingerprint chip 20 further includes a protective layer 220, such as a passivation layer 220, on the plurality of metal layers. The passivation layer 220 is used for protection. The lower electrode 130 is located on a second region 202 of the substrate 210.

The top metal layer TM includes a drive trace 230, that is, the drive trace 230 is fabricated at the top metal layer TM. In addition, the top metal layer TM may further include other traces. The drive trace 230 has one end close to the piezoelectric layer 110, and the other end close to an edge of the ultrasonic fingerprint chip 20. The passivation layer 220 is provided with a first window 221, and the upper electrode 120 covers an upper surface of the piezoelectric layer 110 and fills the first window 221, so that the upper electrode 120 is in contact with a first connection region 231 of the drive trace 230 in the first window 221.

For example, the upper electrode 120 is made of a silver paste material. The upper electrode 120 is formed as a silver paste pad 121 in the first connection region 231 of the drive trace 230, to implement direct interconnection between the top metal layer TM and the upper electrode 120. Specifically, uncured silver paste is fluid, and can extend from the upper surface of the piezoelectric layer 110 into the first window 221 along an edge of the piezoelectric layer, to be formed both on the upper surface of the piezoelectric layer 110 and in the first window 221, so that the upper electrode 120 is in contact with a part of the drive trace 230 in the first window 221. The silver paste may span a three-dimensional structure of the piezoelectric layer 110, and the silver paste pad 121 may be formed in the first connection region 231 of the drive trace 230 through the first window 221.

It should be understood that the upper electrode 120 extending from the upper surface of the piezoelectric layer 110 into the first window 221 means that the upper electrode 120 extends from the upper surface of the piezoelectric layer 110 into the first window 221 and covers some or all of space in the first window 221. Usually, to prevent the silver paste of the upper electrode 120 from overflowing from the first window 221, the silver paste may cover some of the space in the first window 221 without filling the entire first window 221, provided that the silver paste can be in contact with the drive trace 230.

In an implementation, the first window 221 includes N sub windows corresponding to the N drive traces 230, and the first connection region 231 of each drive trace 230 is located in a sub window corresponding to the drive trace.

In other words, the first window 221 may be a whole window, first connection regions 231 of the N drive traces 230 are all located in the first window 221, and the upper electrode 120 extends from the upper surface of the piezoelectric layer 110 into the first window 221, and is connected to the first connection regions 231 of the N drive traces in the first window 221.

Alternatively, the first window 221 may include M sub windows, where M is a positive integer less than or equal to N. For example, when M=N, the first window 221 includes N sub windows corresponding to the N drive traces 230, and the upper electrode 120 extends from the upper surface of the piezoelectric layer 110 into the N sub windows, to connect to first connection regions 231 of the N drive traces 230 in respective sub windows.

It should be understood that the N drive traces are divided based on a quantity of independent signals, a drive trace that transmits one independent signal is referred to as one drive trace, and the N drive traces respectively transmit N independent signals. However, there may be one metal wire or a plurality of metal wires connected in parallel in each drive trace for transmitting an independent signal corresponding to the drive trace.

In an implementation, the passivation layer 220 is further provided with N second windows 222 corresponding to N drive traces 230, and each drive trace 230 is located in a second connection region 232 in the second window 222 corresponding to the drive trace, and is connected, via a pad 241 corresponding to the drive trace, to a lead 310 corresponding to the drive trace.

In this embodiment, within the N second windows 222, second connection regions 232 of the N drive traces 230 are connected to corresponding N leads 310 via N pads 241 respectively. The substrate of the CMOS chip 20 is a silicon substrate, and a bonding process can be implemented on the substrate 210. Therefore, with the second window 222 provided, the drive trace 230 can be connected to the lead 310 through the bonding process, to connect the drive trace 230 to the circuit board 30 via the lead 310.

It should be noted that the N first connection regions 231 of the N drive traces are connected via the silver paste of the upper electrode 120, and the N second connection regions 232 of the N drive traces need to be connected to the corresponding N leads via N independent bonding pads 241 respectively.

In this embodiment of the present application, the quantity N of drive traces 230 may be a positive integer, for example, N=1 indicates that only one drive trace is fabricated at the top metal layer TM; or N=2 indicates that two independent drive traces 230 are fabricated at the top metal layer TM for respectively transmitting two independent signals; or more independent drive traces 230 may be fabricated at the top metal layer TM.

For example, N=1, as shown in FIG. 5. FIG. 5 is a top view of a possible structure of the ultrasonic fingerprint apparatus 2 shown in FIG. 4. The top metal layer TM includes one drive trace 230. The passivation layer 220 is provided with a first window 221 corresponding to the drive trace 230. The upper electrode 120 extends from the upper surface of the piezoelectric layer 110 into the first window 221, to connect to a first connection region 231 of the drive trace 230 in the first window 221.

For another example, N=2, as shown in FIG. 6. FIG. 6 is a top view of another possible structure of the ultrasonic fingerprint apparatus 2 shown in FIG. 4. The top metal layer TM includes two drive traces: a drive trace 230A and a drive trace 230B. The passivation layer 220 is provided with a sub window 221A corresponding to the drive trace 230A and a sub window 221B corresponding to the drive trace 230B. The upper electrode 120 extends from the upper surface of the piezoelectric layer 110 into the sub window 221A and the sub window 221B, to respectively connect to a part of the drive trace 230A in the sub window 221A and a part of the drive trace 230B in the sub window 221B.

A material of the drive trace 230 is usually metal such as aluminum (Al). Aluminum has a high chemical activity, and forms aluminum oxide ($Al_2O_3$) in the air. When the passivation layer 220 is provided with a window, aluminum in the first connection region 231 of the drive trace 230 in the first window 221 is exposed to the air, and an aluminum oxide film is formed on a surface of the first connection region. The aluminum oxide is non-conductive, and the aluminum oxide film prevents interconnection between the silver paste and the aluminum, leading to poor contact between the upper electrode 120 and the drive trace 230. To eliminate impact of the oxide layer on the first connection region 231, the surface of the first connection region 231 may be coated with an anti-oxidation protective layer, or a high voltage may be applied to the drive trace 230 to break down the oxide layer at the high voltage. However, in the former case, the coating process greatly increases costs. In the latter case, an equivalent circuit of the piezoelectric layer 110 is a capacitor, the capacitor is equivalent to an open circuit for a direct-current voltage, and whether the oxide layer is broken down cannot be determined by measuring a resistance, and can be measured only using an alternating-current signal. Therefore, accuracy is insufficient, and direct determining is impossible. In addition, the applied high voltage is applied to two ends of the oxide layer through the equivalent capacitor of the piezoelectric layer 110. As a result, a voltage actually applied to the two ends of the oxide layer is much lower than the externally applied voltage. In this case, a higher voltage is required for breaking down the oxide layer. This is not conducive to implementation of mass production.

Figure 7:
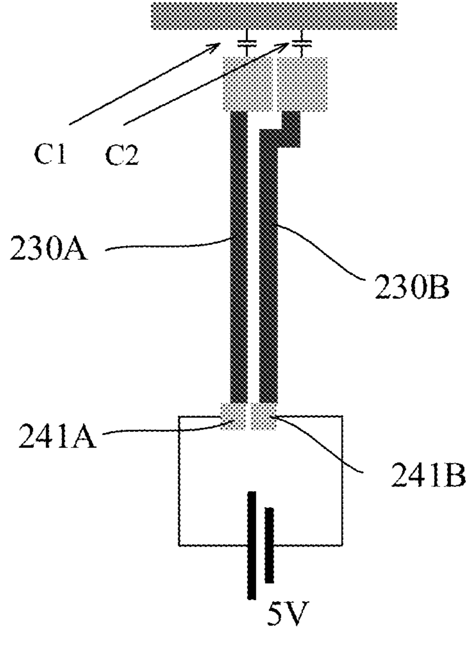
FIG. 7 is a diagram of an equivalent circuit between a drive trace and an upper electrode when an oxide layer formed on a first connection region is not broken down.
Figure 8:
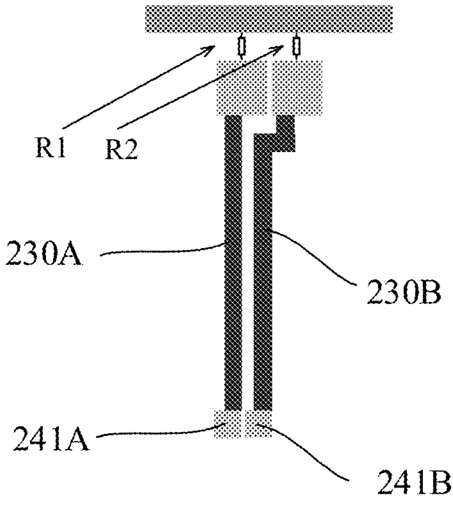
FIG. 8 is a diagram of an equivalent circuit between a drive trace and an upper electrode when an oxide layer formed on a first connection region is broken down.

In the case shown in FIG. 6 in which the quantity of drive traces 230 is 2, efficiency of breaking down the oxide layer can be significantly improved, and a direct-current resistance obtained after the breakdown can be accurately detected. This is described in detail below with reference to FIG. 7 and FIG. 8. FIG. 7 is an equivalent circuit diagram before the oxide layer is broken down. FIG. 8 is an equivalent circuit diagram after the oxide layer is broken down.

As shown in FIG. 7, a bonding pad 241A connected to the drive trace 230A and a bonding pad 241B connected to the drive trace 230B each are connected to an external voltage. For example, the bonding pad 241A is connected to 5 V, and the bonding pad 241B is connected to GND; or the bonding pad 241A is connected to GND, and the bonding pad 241B is connected to 5 V. 5 V herein is only an example, and another voltage value may alternatively be used.

It is assumed that there is an oxide layer between a part of the drive trace 230A in the sub window 221A and a silver paste pad 121A of the upper electrode 120, and that there is an oxide layer 2313 between a part of the drive trace 230B in the sub window 221B and a silver paste pad 121B of the upper electrode 120. The oxide layer 2313 may be equivalent to a capacitor C1 and a capacitor C2 shown in FIG. 7. Then, a voltage of 5 V is directly applied to two ends of the oxide layer 2313, to directly break down the oxide layer 2313 without being interrupted by the capacitor C1 or the capacitor C2 of the piezoelectric layer 110. A current corresponding to the external voltage of 5 V is measured. When the oxide layer 2313 is broken down, the current corresponding to the voltage of 5 V significantly increases, so that whether the oxide layer 2313 is broken down can be accurately determined. When it is determined that the oxide layer 2313 is broken down, as shown in FIG. 8, direct-current resistances R1 and R2 between the bonding pad 241A and the bonding pad 241B may be measured to directly determine the breakdown effect and interconnection impedance, so as to accurately determine a connection status between the upper electrode 120 and the drive trace 230 after the breakdown.

Throughout the foregoing test process, only a direct-current voltage needs to be used for testing, and no alternating-current voltage needs to be used for measuring a capacitance. In addition, a test voltage is much lower, so that an interconnection resistance can be accurately measured and monitored, without increasing a size of the ultrasonic fingerprint chip 20. This reduces costs and improves test efficiency, thereby facilitating mass production.

It should be understood that, during application in a practical product after the testing, the bonding pad 241A and the bonding pad 241B may continue to remain disconnected, or may be short-circuited. To be specific, a second connection region 232 of the drive trace 230A and a second connection region 232 of drive trace 230B may be disconnected from or connected to each other. When the second connection regions are connected, the drive trace 230A and the drive trace 230B are combined into one drive trace 230.

In FIG. 7 and FIG. 8, for example, the top metal layer TM has two drive traces, that is, N=2. When N is another value, drive traces need to be tested in pairs. For example, when N=3, a first drive trace and a second drive trace may be first tested, where one of the drive traces is grounded, and a voltage is applied to the other drive trace. Then the second drive trace and a third drive trace are tested, where one of the drive traces is grounded, and a voltage is applied to the other drive trace.

For simplicity, a position relationship between the drive trace 230 and each metal layer and sizes thereof are described below by using an example in which N=1, that is, the top metal layer TM includes one drive trace.

In an implementation, as shown in FIG. 4 to FIG. 6, the piezoelectric layer 110 extends onto the plurality of metal layers, the N drive traces 230 extend into the piezoelectric layer 110, and the first connection regions 231 of the N drive traces 230 are adjacent to the piezoelectric layer 110. When the piezoelectric layer 110 extends onto the plurality of metal layers and the drive trace 230 extends into the piezoelectric layer 110, the first connection region 231 of the drive trace 230 can be close to an edge of the piezoelectric layer 110, that is, a distance between the piezoelectric layer 110 and the first connection region 231 is minimized, so that a structure of the ultrasonic fingerprint apparatus 2 is more compact.

In an implementation, as shown in FIG. 4, a size of the first window 221 is greater than or equal to that of the first connection regions 231 of the N drive traces, the upper electrode 120 extends from the upper surface of the piezoelectric layer to a first part 221*a* of the first window 221 to cover the first connection regions 231 of the N drive traces 230, and a second part 221*b* of the first window 221 is located under the piezoelectric layer 110.

It can be learned that, when the size of the first window 221 is greater than that of the first connection region 231, the upper electrode 120 extends to the first part 221*a* of the first window 221 to cover the first connection region 231 of the drive trace 230 in the first part 221*a*, and the second part 221*b* of the first window 221 extends into the piezoelectric layer 110 and is located under the piezoelectric layer 110, to improve reliability of a connection between the upper electrode 120 and the drive trace 230.

In an implementation, for example, a size S of the first part 221*a* along a direction of the drive trace 230, that is, a direction X, is greater than or equal to 150 μm. In FIG. 4, for example, the size S of the first window 221 is equal to 240 μm. For example, a size g of the second part 221*b* along the direction of the drive trace 230 is greater than or equal to 20 μm.

Because a voltage of a drive signal of the upper electrode 120 is usually high and is significantly higher than an operating voltage of a line in the ultrasonic fingerprint chip 20, the drive signal of the upper electrode is likely to interfere with the line in the ultrasonic fingerprint chip 20, and is also likely to cause electrical breakdown to damage the ultrasonic fingerprint chip 20. Therefore, in an implementation, a specific distance should be kept between the N drive traces 230 and other traces adjacent to the N drive traces 230 at the top metal layer TM. For example, a distance between the N drive traces 230 and other traces adjacent to the N drive traces 230 at the top metal layer is greater than or equal to 10 μm, to avoid breakdown at a same layer, ensure safety of the ultrasonic fingerprint apparatus 2, and also prevent the drive trace 230 from interfering with another trace at the top metal layer.

Figure 9:
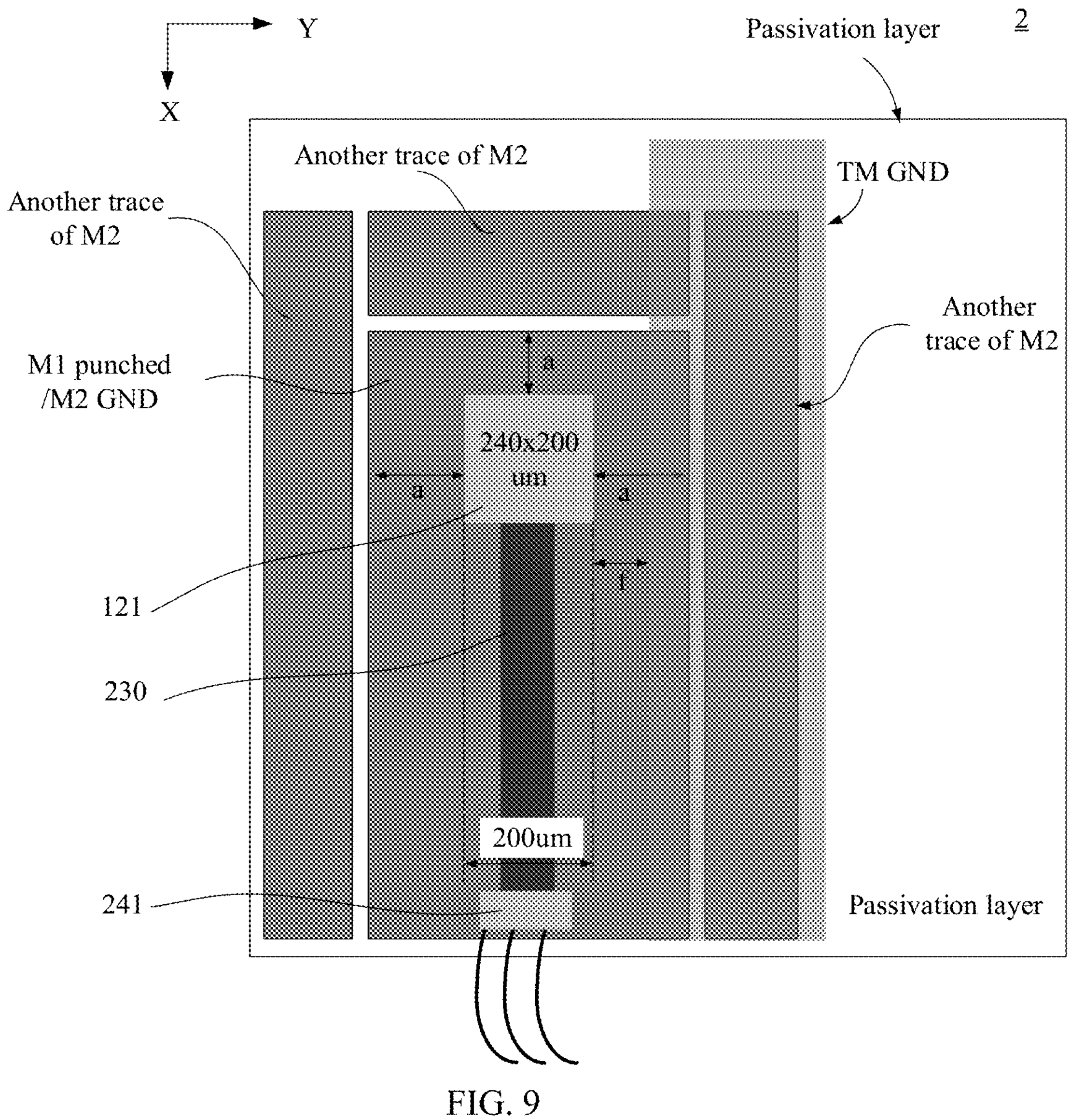
FIG. 9 is schematic top view of a partial region of the ultrasonic fingerprint apparatus shown in FIG. 4.

FIG. 9 is a schematic top view of a partial region of the ultrasonic fingerprint apparatus 2 shown in FIG. 4. For example, FIG. 9 shows only one drive trace, and a distance f between the drive trace 230 and another trace at the top metal layer TM is 10 μm.

In this embodiment of the present application, because the drive trace 230 is electrically connected to the silver paste pad 121, a described distance between any metal layer and the drive trace 230 is a distance between the metal layer and an edge of the silver paste pad 121. In FIG. 9, for example, the silver paste pad 121 is rectangular and has a size of 240 μm×200 μm. A size of the first connection region 231 of the drive trace 230 along a Y direction may be considered as a corresponding size of the silver paste pad 121. A size of the drive trace 230 along the Y direction is 200 μm, as indicated by a dashed line in FIG. 9. The indicated distance between each metal layer and the drive trace 230 is a distance between the metal layer and the dashed line, that is, a distance between the metal layer and the edge of the silver paste pad 121.

In an implementation, other traces adjacent to the N drive traces 230 at the top metal layer TM are grounded. In this way, the top metal layer TM performs a function of shielding the N drive traces 230, to prevent the N drive traces 230 from interfering with other traces at the top metal layer TM. For example, FIG. 9 shows only other traces on the right of the drive trace 230 at the top metal layer TM, and other traces adjacent to the drive trace 230 at the top metal layer TM are grounded. Similarly, parts (not shown) on the upper and left sides of the drive trace 230 at the top metal layer TM are also grounded.

In an implementation, as shown in FIG. 4 to FIG. 9, a region, at the first metal layer M1 of the plurality of metal layers, that corresponds to the N drive traces 230 is punched, and the first metal layer M1 is an adjacent metal layer under the top metal layer TM.

The first metal layer M1 is an adjacent metal layer under the top metal layer TM. A corresponding region under the N drive traces 230 at the first metal layer M1 is punched, so that an electrical clearance between the N drive traces 230 and other traces at the first metal layer M1 is increased. In this way, a voltage withstand strength of the first metal layer M1 is improved, to avoid inter-layer breakdown between the top metal layer TM and the first metal layer M1.

To further increase the electrical clearance between the drive trace 230 and another trace at the first metal layer M1, and avoid inter-layer breakdown between the top metal layer TM and the first metal layer M1 to a maximum extent, in an implementation, as shown in FIG. 4 to FIG. 9, the region, at the first metal layer M1, that corresponds to the N drive traces 230, and a region extending by a distance of 12 μm or more around from the region are punched. That is, a punched region is extended around from the region corresponding to the N drive traces 230 by a specific distance a.

In an implementation, as shown in FIG. 4 to FIG. 9, a region, at the second metal layer M2 of the plurality of metal layers, that corresponds to the N drive traces 230 is grounded, and the second metal layer M2 is an adjacent metal layer under the first metal layer M1.

The second metal layer M2 is an adjacent metal layer under the first metal layer M1. A corresponding region under the N drive traces 230 at the second metal layer M2 is grounded, so that the second metal layer M2 performs a function of shielding the N drive traces 230, to prevent another trace at the second metal layer M2 from interfering with a trace at the third metal layer M3 under the another trace. In this way, traces at the third metal layer M3 and the fourth metal layer M4 can be flexibly selected.

To further enhance the function of shielding the drive trace 230 by the second metal layer M2, and minimize interference caused by another trace at the second metal layer M2 to a trace at the third metal layer M3 under the another trace, in an implementation, the region, at the second metal layer M2, that corresponds to the N drive traces 230, and a region extending 12 μm or more around from the region are grounded. For example, as shown in FIG. 4 to FIG. 9, a region, at the second metal layer M2, that is under the drive trace 230 and that is formed through extension around by a distance a is grounded, to reduce interference caused by another trace at the second metal layer M2 to a trace at the third metal layer M3 under the another trace.

Usually, the lower electrode 130 is an electrode array including a plurality of electrodes, and each electrode in the electrode array corresponds to one pixel in a fingerprint image. Therefore, the electrode array under the piezoelectric layer 110 may be considered as a pixel array.

To prevent a high voltage of the drive trace 230 from causing electrical breakdown and interference to the metal layer in the ultrasonic fingerprint chip 20, in an implementation, as shown in FIG. 4 to FIG. 6, the top metal layer TM is provided with a GND pad 242 for grounding, and the GND pad 242 is located on a side of the second connection regions 232 of the N drive traces 230. The GND pad 242 is provided on a side of the bonding pads 241 of the N drive traces 230, and there is a specific distance between the GND pad 242 and the bonding pads 241, to prevent a drive signal transmitted on the drive trace 230 from interfering with another surrounding signal.

Figure 10:
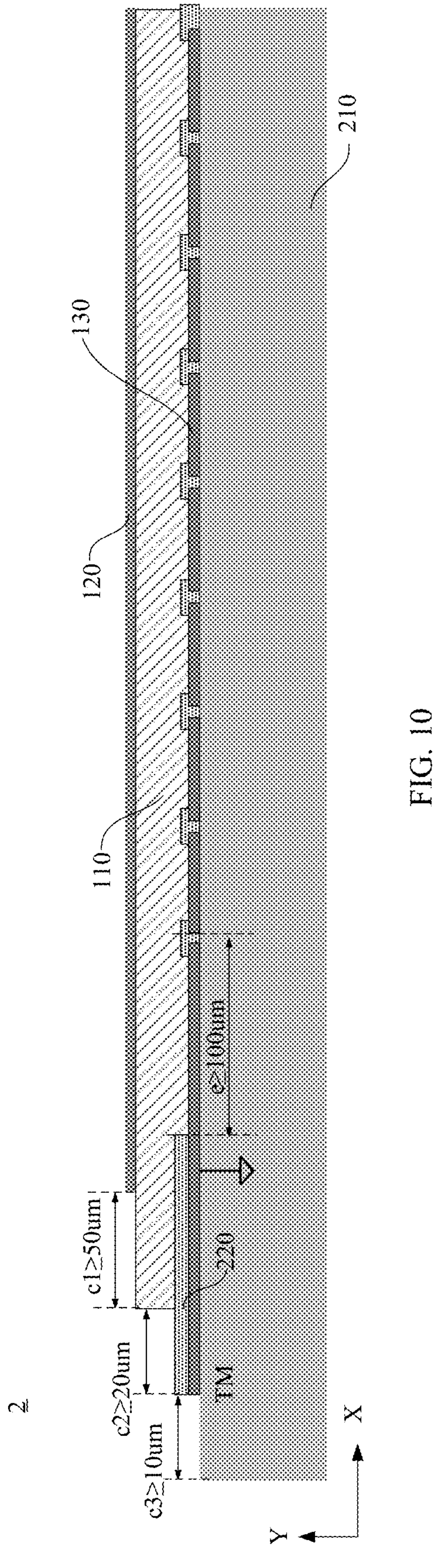
FIG. 10 is a sectional view of a region A in FIG. 5 along a direction perpendicular to an edge of a piezoelectric transducer.

FIG. 10 is a sectional view of a region A in FIG. 5 along a direction perpendicular to an edge of the piezoelectric transducer 10. In an implementation, as shown in FIG. 10, a distance e between the lower electrode 130 and the passivation layer 220 around the lower electrode 130 is greater than or equal to 100 μm. In another implementation, as shown in FIG. 10, other traces adjacent to the lower electrode 130 at the top metal layer TM are grounded.

There is a specific distance between the lower electrode 130 and the passivation layer 220 around the lower electrode 130, and/or other traces adjacent to the lower electrode 130 at the top metal layer TM are grounded. This can perform a shielding function to prevent external interference from affecting pixels close to an edge of the array of the lower electrode 130.

In addition, as shown in FIG. 10, for pixels at a left edge, because a distance e is reserved for a window for the passivation layer 220, there is also a metal line on the left of the edge pixels, and a balance is achieved between the metal line on the left and an electrode on the right of the edge pixels. In this way, the edge pixels function similar to center pixels, thereby reducing the edge effect of the edge pixels, and improving uniformity between the edge pixels and the center pixels.

In an implementation, as shown in FIG. 10, a distance c1 between an edge of the upper electrode 120 and an edge of the piezoelectric layer 110 is greater than or equal to 50 μm. This prevents the upper electrode 120 from overflowing to the surface of the ultrasonic fingerprint chip 20, and avoids a breakdown risk.

In addition, as shown in FIG. 10, an edge of the passivation layer 220 exceeds the edge of the piezoelectric layer 110 by a distance c2, where c2, for example, is greater than or equal to 20 μm; and/or an edge of the substrate 210 exceeds the edge of the passivation layer 220 by c3, where c3, for example, is greater than or equal to 10 μm.

In an implementation, N=1, and an area of a part of the first window 221 that is close to the piezoelectric layer 110 is greater than that of a part of the first window that is away from the piezoelectric layer 110, thereby improving reliability of a connection between the upper electrode 120 and the drive trace.

Figure 11:
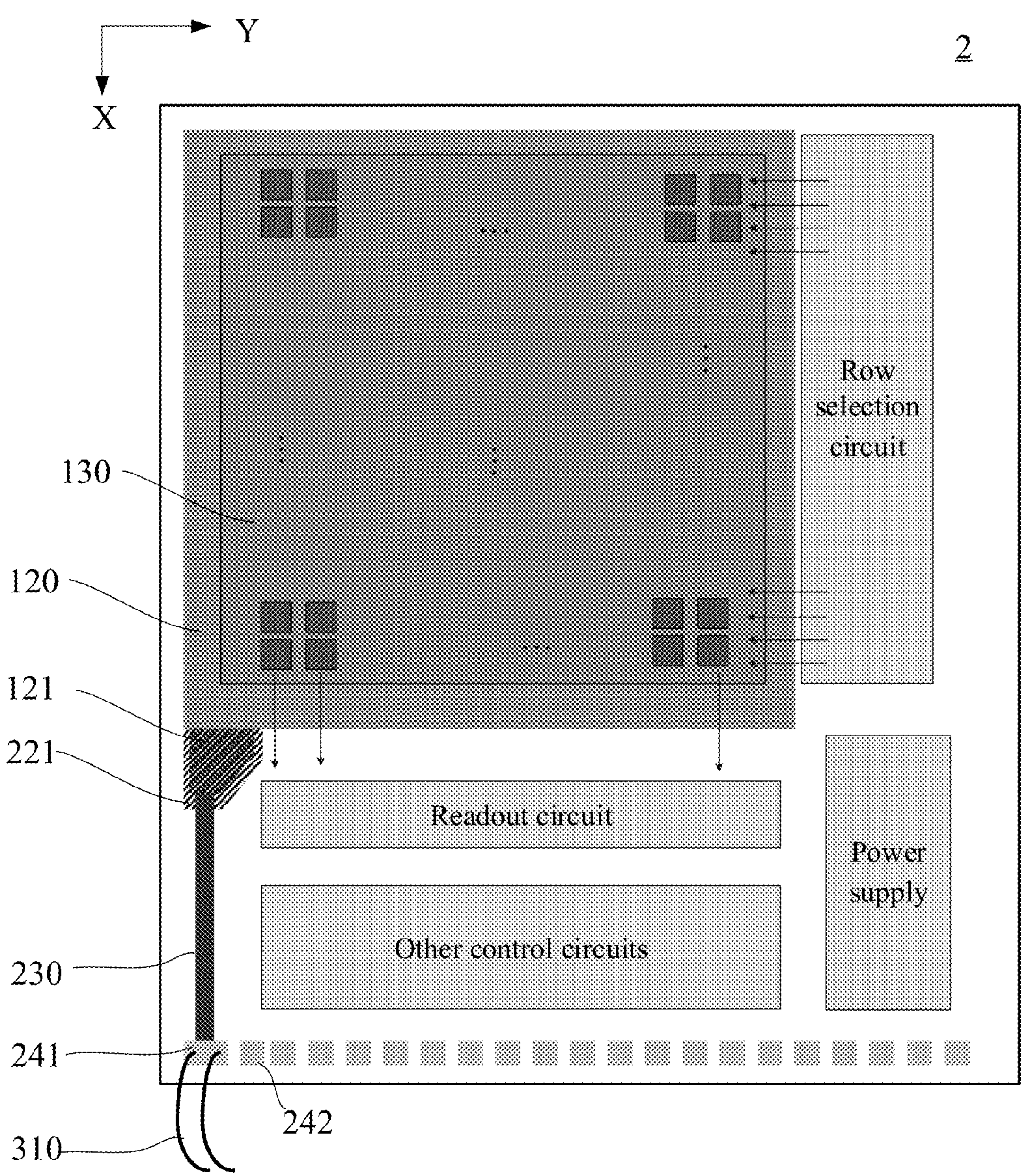
FIG. 11 is a schematic diagram of a shape of a first window according to an embodiment of the present application.
Figure 12:
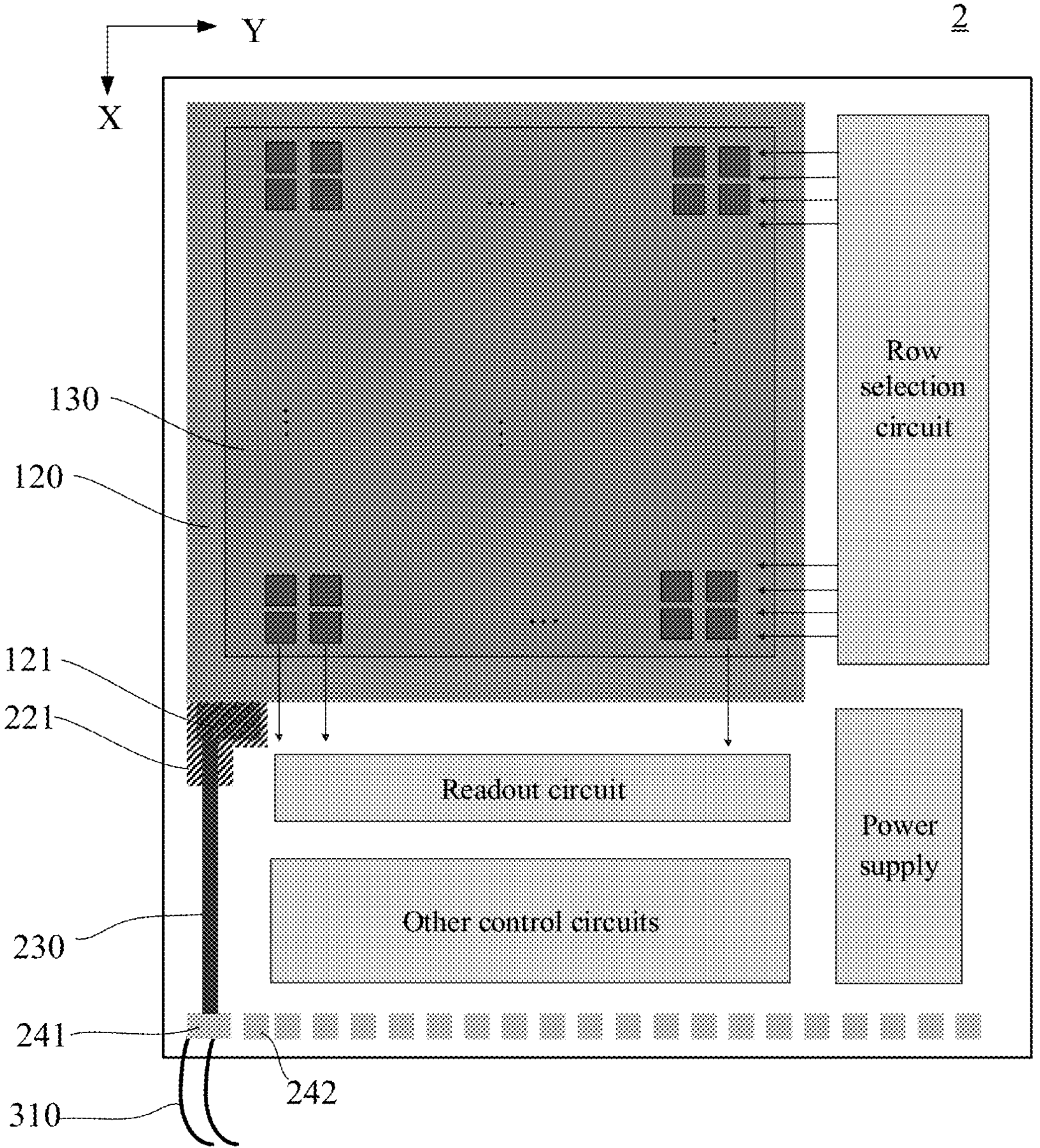
FIG. 12 is a schematic diagram of a shape of a first window according to another embodiment of the present application.
Figure 13:
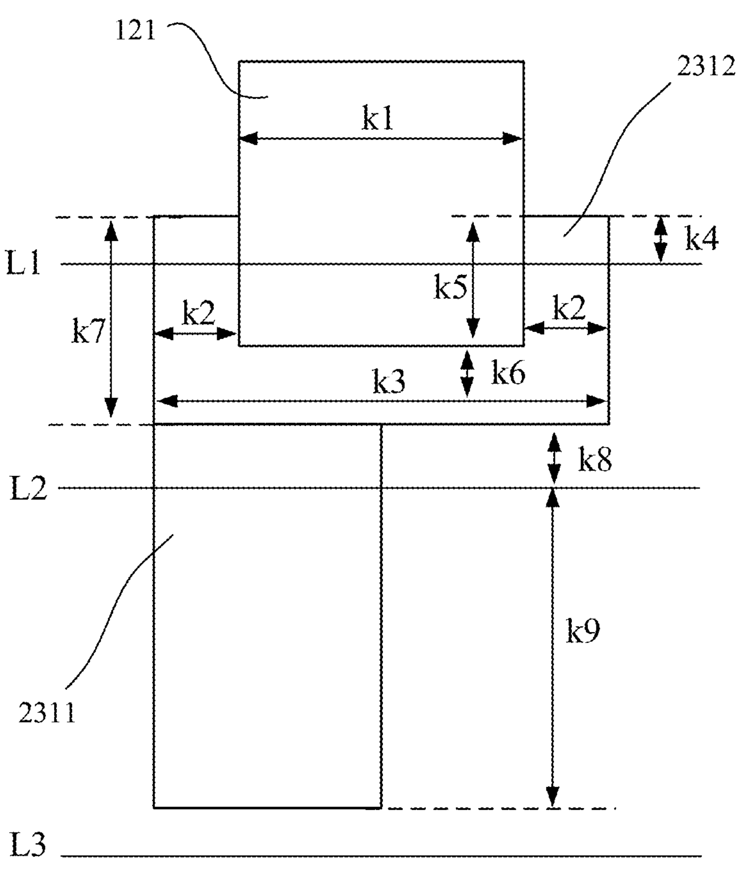
FIG. 13 is a schematic diagram of some possible sizes of an L shape in FIG. 12.

For example, FIG. 11 to FIG. 13 show shapes and sizes of the first window 221 in some implementations of the present application. For example, as shown in FIG. 11, a shape of the first window 221 is a trapezoid, and a lower base of the trapezoid is closer to the piezoelectric layer 110 than an upper base of the trapezoid. For another example, as shown in FIG. 12 and FIG. 13, a shape of the first window 221 is an L shape, and the L shape includes a first part 2311 parallel to the direction of the drive trace 230, and a second part 2312 perpendicular to the direction of the drive trace 230, and the second part 2312 is closer to the piezoelectric layer 110 than the first part 2311.

FIG. 13 shows some possible sizes of the L-shaped first window 221 in FIG. 12. A size of a part of the L shape that is close to the piezoelectric layer 110 along a Y direction is greater than that of a part of the L shape that is away from the piezoelectric layer 110 along the Y direction, to improve reliability of a connection between the upper electrode 120 and the first connection region 231 of the drive trace 230, without occupying an additional area. L1, L2, and L3 indicate an edge of the piezoelectric layer 110, an edge of an over coating on a surface of the upper electrode 120, and a die edge of the ultrasonic fingerprint chip 20, respectively. The silver paste pad 121 fills some regions in the L-shaped first window 221, and covers the first connection region 231 of the drive trace 230. FIG. 13 is only an example. k1 is a size of the silver paste pad 121, k1=204 μm, and sizes of the L shape are as follows: k2=100 μm, k3=404 μm, k4=20 μm, k5=244.5 μm, k6=100 μm, k7=215 μm, k8=100 μm, and k9 is determined based on k7 and may be 1,000 μm herein.

It should be understood that ranges of the parameters not specifically described in FIG. 4 to FIG. 13 may be considered to be shown values ±50%.

Figure 14:
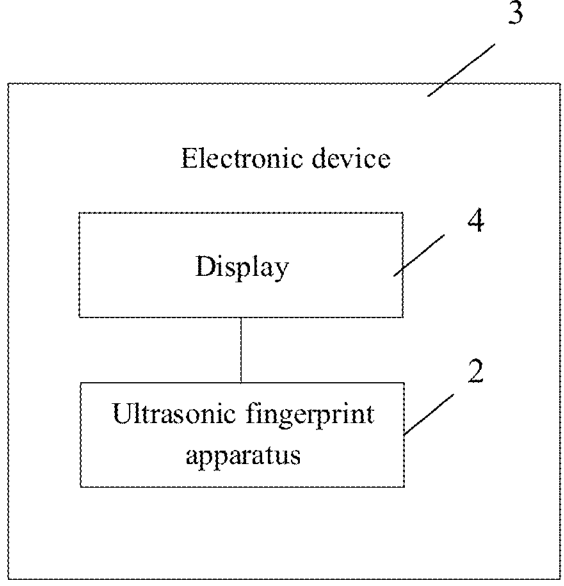
FIG. 14 is a schematic block diagram of an electronic device according to an embodiment of the present application.

As shown in FIG. 14, the present application further provides an electronic device 3. The electronic device 3 includes a display 4 and an ultrasonic fingerprint apparatus 2 described above. An ultrasonic fingerprint chip 20 is bonded to the display 4 via an adhesive film 301, so that the ultrasonic fingerprint apparatus 2 is located under the display 4, to implement under-display ultrasonic fingerprint recognition.

As an example rather than a limitation, the electronic device in this embodiment of the present application may be a portable or mobile computing device such as a terminal device, a mobile phone, a tablet computer, a laptop computer, a desktop computer, a gaming device, a vehicle-mounted electronic device, or a wearable intelligent device, or another electronic device such as an electronic database, an automobile, or an automated teller machine (ATM). The wearable intelligent device includes a device that provides a complete function, has a large size, and can implement all or some functions without relying on a smartphone, for example, a smartwatch or smart glasses; and includes a device that focuses only on a specific type of application function and needs to be used in combination with another device such as a smartphone, for example, various devices for vital sign monitoring, such as a smart band and smart jewelry.

It should be noted that, without a conflict, the embodiments described in the present application and the technical features in the embodiments may be randomly combined, and a technical solution obtained after combination also falls within the scope of protection of the present application.

The system, apparatus, and method disclosed in the embodiments of the present application may be implemented in other manners. For example, some features in the method embodiment described above may be ignored or not executed. The apparatus embodiment described above is merely an example. Division into the units is merely logical function division and may be other division during actual implementation. A plurality of units or components may be combined or integrated into another system. In addition, couplings between units or components may be direct couplings or indirect couplings, and the couplings include electrical connections, mechanical connections, or connections in other forms.

It can be clearly understood by a person skilled in the art that, for ease and brevity of description, for the specific operation process and technical effects of the apparatus and device described above, reference may be made to the corresponding process and technical effects in the foregoing method embodiment, and details are not described herein again.

It should be understood that the specific examples in the embodiments of the present application are merely intended to help a person skilled in the art better understand the embodiments of the present application, but not to limit the scope of the embodiments of the present application. A person skilled in the art may make various improvements or variations based on the foregoing embodiments, and all these improvements or variations fall within the scope of protection of the present application.

The descriptions are merely specific implementations of the present application, but are not intended to limit the scope of protection of the present application. Any variation or replacement readily figured out by a person skilled in the art within the technical scope disclosed in the present application shall fall within the scope of protection of the present application. Therefore, the scope of protection of the present application shall be subject to the scope of protection of the claims.

What is claimed is:

1. An ultrasonic fingerprint apparatus, disposed under a display of an electronic device to implement under-display ultrasonic fingerprint recognition, the ultrasonic fingerprint apparatus comprising an ultrasonic fingerprint chip and a piezoelectric transducer disposed on the ultrasonic fingerprint chip, wherein:

the piezoelectric transducer comprises a piezoelectric layer, an upper electrode on the piezoelectric layer, and a lower electrode under the piezoelectric layer; and the ultrasonic fingerprint chip is a complementary metal-oxide-semiconductor (CMOS) chip, the upper electrode is led out from an upper surface of the piezoelectric layer to a surface of the CMOS chip, and is connected to a circuit board through a pad on the surface of the CMOS chip, to implement an electrical connection between the piezoelectric transducer and the circuit board;

wherein the ultrasonic fingerprint chip comprises a substrate and a plurality of metal layers provided in a first region of the substrate, the substrate is a silicon substrate, the lower electrode is located on a second region of the substrate, a top metal layer of the plurality of metal layers comprises N drive traces, N being 1 or a positive integer greater than 1, the upper electrode is connected to N pads via the N drive traces respectively, and the N pads connect the N drive traces to respective leads.

2. The ultrasonic fingerprint apparatus according to claim 1, wherein a passivation layer is provided on the top metal layer, the passivation layer is provided with a first window corresponding to the N drive traces, and the upper electrode extends from the upper surface of the piezoelectric layer into the first window, to connect to respective first connection regions of the N drive traces in the first window.

3. The ultrasonic fingerprint apparatus according to claim 2, wherein the first window comprises N sub windows corresponding to the N drive traces, and the first connection region of each drive trace is located in a sub window corresponding to the drive trace.

4. The ultrasonic fingerprint apparatus according to claim 2, wherein the passivation layer is further provided with N second windows corresponding to the N drive traces, and each drive trace is located in a second connection region in the second window corresponding to the drive trace, and is connected, via a pad corresponding to the drive trace, to a lead corresponding to the drive trace.

5. The ultrasonic fingerprint apparatus according to claim 2, wherein the piezoelectric layer extends onto the plurality of metal layers, the N drive traces extend into the piezoelectric layer, and the first connection regions of the N drive traces are adjacent to the piezoelectric layer.

6. The ultrasonic fingerprint apparatus according to claim 5, wherein a size of the first window is greater than that of the first connection regions of the N drive traces, the upper electrode extends from the upper surface of the piezoelectric layer to a first part of the first window to cover the first connection regions of the N drive traces, and a second part of the first window is located under the piezoelectric layer.

7. The ultrasonic fingerprint apparatus according to claim 6, wherein a size of the first part in a direction of the N drive traces is greater than or equal to 150 μm; and/or a size of the second part in the direction of the N drive traces is greater than or equal to 20 μm.

8. The ultrasonic fingerprint apparatus according to claim 1, wherein a distance between the N drive traces and other traces adjacent to the N drive traces at the top metal layer is greater than or equal to 10 μm; and/or other traces adjacent to the N drive traces at the top metal layer are grounded.

9. The ultrasonic fingerprint apparatus according to claim 1, wherein a region, at a first metal layer of the plurality of metal layers, that corresponds to the N drive traces is punched, and the first metal layer is an adjacent metal layer under the top metal layer.

10. The ultrasonic fingerprint apparatus according to claim 9, wherein the region, at the first metal layer, that corresponds to the N drive traces, and a region extending 12 μm or more around from the region are punched.

11. The ultrasonic fingerprint apparatus according to claim 1, wherein a region, at a second metal layer of the plurality of metal layers, that corresponds to the N drive traces is grounded, and the second metal layer is an adjacent metal layer under the first metal layer.

12. The ultrasonic fingerprint apparatus according to claim 11, wherein the region, at the second metal layer, that corresponds to the N drive traces, and a region extending 12 μm or more around from the region are grounded.

13. The ultrasonic fingerprint apparatus according to claim 4, wherein the top metal layer is provided with a pad for grounding, and the pad is provided on a side of the second connection regions of the N drive traces.

14. The ultrasonic fingerprint apparatus according to claim 1, wherein a distance between the lower electrode and the passivation layer around the lower electrode is greater than or equal to 100 μm; and/or other traces adjacent to the lower electrode at the top metal layer are grounded.

15. The ultrasonic fingerprint apparatus according to claim 1, wherein a distance between an edge of the upper electrode and an edge of the piezoelectric layer is greater than or equal to 50 μm.

16. The ultrasonic fingerprint apparatus according to claim 2, wherein N=1, and an area of a part of the first window that is close to the piezoelectric layer is greater than that of a part of the first window that is away from the piezoelectric layer.

17. The ultrasonic fingerprint apparatus according to claim 16, wherein a shape of the first window is a trapezoid, and a lower base of the trapezoid is closer to the piezoelectric layer than an upper base of the trapezoid.

18. The ultrasonic fingerprint apparatus according to claim 16, wherein a shape of the first window is an L shape, and the L shape comprises a first part parallel to the direction of the drive trace, and a second part perpendicular to the direction of the drive trace, and the second part is closer to the piezoelectric layer than the first part.

19. An electronic device, comprising:

a display; and an ultrasonic fingerprint apparatus, wherein the ultrasonic fingerprint apparatus is disposed under the display to implement under-display ultrasonic fingerprint recognition, the ultrasonic fingerprint apparatus comprises an ultrasonic fingerprint chip and a piezoelectric transducer disposed on the ultrasonic fingerprint chip, wherein:

the piezoelectric transducer comprises a piezoelectric layer, an upper electrode on the piezoelectric layer, and a lower electrode under the piezoelectric layer; and the ultrasonic fingerprint chip is a complementary metal-oxide-semiconductor (CMOS) chip, the upper electrode is led out from an upper surface of the piezoelectric layer to a surface of the CMOS chip, and is connected to a circuit board through a pad on the surface of the CMOS chip, to implement an electrical connection between the piezoelectric transducer and the circuit board;

wherein the ultrasonic fingerprint chip comprises a substrate and a plurality of metal layers provided in a first region of the substrate, the substrate is a silicon substrate, the lower electrode is located on a second region of the substrate, a top metal layer of the plurality of metal layers comprises N drive traces, N being 1 or a positive integer greater than 1, the upper electrode is connected to N pads via the N drive traces respectively, and the N pads connect the N drive traces to respective leads.

* * * * *